Figure 1:
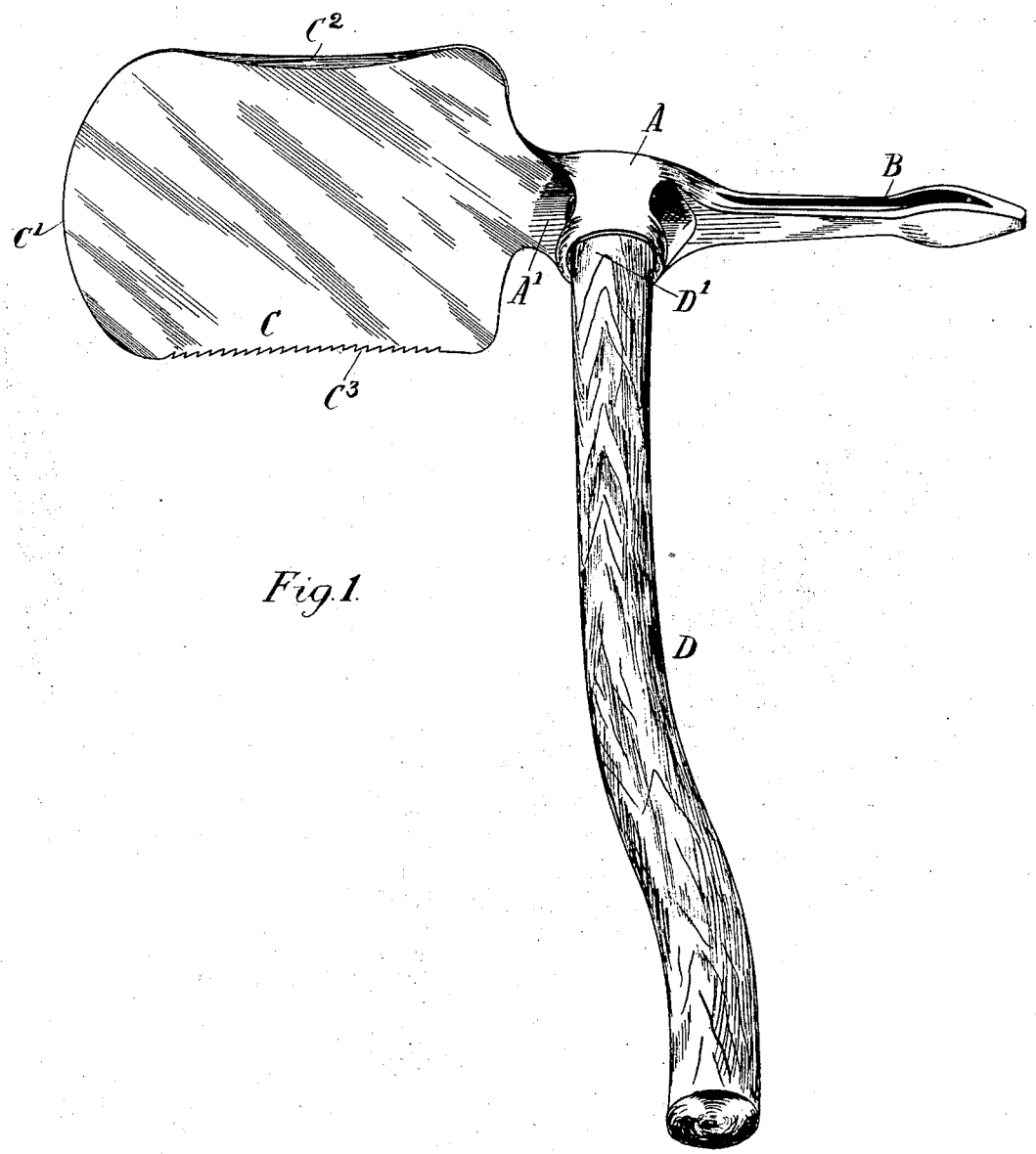

No. 671,107. Patented Apr. 2, 1901.
F. W. C. DOUGLAS.
PIONEER'S TOOL, INTRENCHING TOOL, OR THE LIKE.
(Application filed July 9, 1900.)
(No Model.) 2 Sheets—Sheet 1.

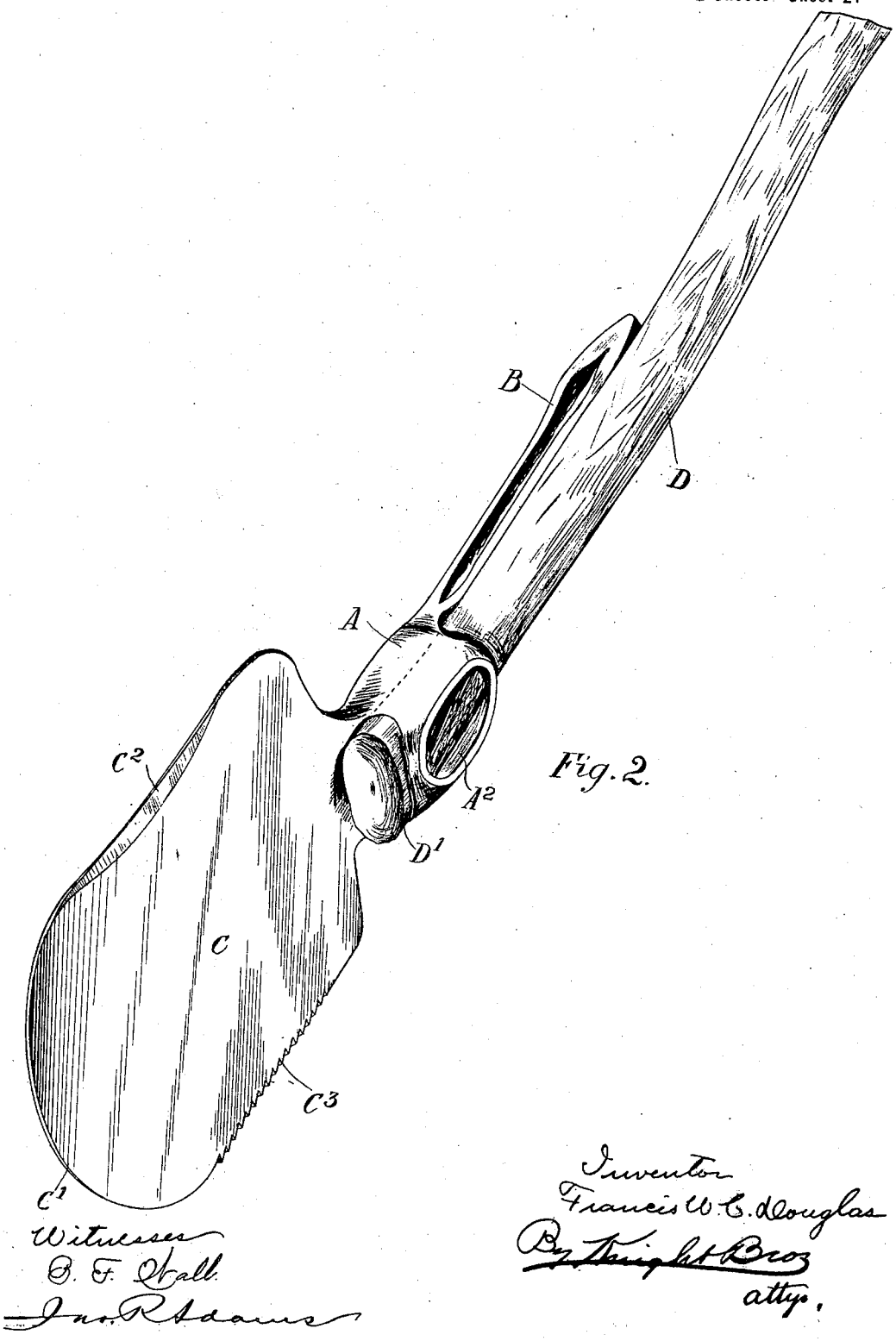

UNITED STATES PATENT OFFICE.

FRANCIS WEMYSS CHARTERIS DOUGLAS, OF LONDON, ENGLAND.

PIONEER'S TOOL, INTRENCHING-TOOL, OR THE LIKE.

SPECIFICATION forming part of Letters Patent No. 671,107, dated April 2, 1901.

Application filed July 9, 1900. Serial No. 23,033. (No model.)

*To all whom it may concern:*

Be it known that I, FRANCIS WEMYSS CHARTERIS DOUGLAS, Earl of Wemyss, a subject of the Queen of England, residing at London, England, have invented certain new and useful Improvements in or Relating to Pioneers' Tools, Intrenching-Tools, or the Like, (for which I have made application for Letters Patent in Great Britain, No. 10,436, dated June 7, 1900,) of which the following is a specification.

This invention relates to pioneers' tools, intrenching-tools, and the like, and has for its object to construct a handy and portable implement which can be adapted for various purposes.

According to this invention the implement comprises two main parts—namely, a handle and a metal head—so shaped as to serve the purpose of various tools, the head and handle being separable and capable of being fitted together in different ways, according to the purpose to which the implement is to be put. The head is formed with a central boss and perforated, so as to form a double socket, through which the handle may be passed in different planes, according to the part of the implement which it is desired to use. From one side of the boss projects a bar shaped so as to form a pick, while from the opposite side of the boss projects a plate of suitable shape, preferably approximately rectangular. The edge of this plate farthest from the boss is conveniently rounded or otherwise cut, so as to form a suitable edge for a shovel or intrenching-tool. One of the lateral edges of the plate is formed with teeth, so as to constitute a saw, while the other edge is sharpened, so as to serve as a cutting edge.

The handle, which may conveniently be made of wood and either curved or straight, as desired, has one end preferably slightly tapered, so as to enable it to be jammed in the boss of the implement. The handle may be passed through the boss in a direction approximately parallel to the bar, forming the pick when the latter lies against the handle, and the article is arranged for use either as a shovel or as a saw or as a chopper or bill. Alternatively the handle may be passed through the boss at right angles to the pick-bar and plate, when the device can be used as a pick or intrenching-tool.

The head of the implement is preferably made of steel and constructed as lightly as is compatible with proper strength.

Though the connection between the handle and the head may conveniently be made solely by the jamming of the one within the other, owing to the tapering of the handle, yet it may be found convenient to provide a pin or other form of removable stop which can be used to prevent the head from shifting on the handle when the device is in use.

When not in use, the handle may be passed half-way through the boss in a direction parallel to the pick-bar and plate, when the implement assumes a compact and portable form.

In the accompanying drawings, Figure 1 is a perspective view showing the improved tool arranged for use either as a pick or as an intrenching-tool. Fig. 2 is a similar view showing the implement arranged for use as a shovel, chopper, or saw.

Like letters indicate like parts throughout the drawings.

The head of the implement comprises a boss A, from which projects on one side a bar B and on the other side a plate C. The boss A is perforated, as at A' and $A^2$, so as to form two sockets, through which the handle D can be passed. The holes A' $A^2$ are slightly tapered, as also is the end D' of the handle D, so that the latter can be passed through the boss and there jammed in a position corresponding to the portion of the head which it is desired to use.

The bar B, which projects from the boss A, is shaped at the end so as to serve as a pick. The plate C is preferably approximately rectangular in shape and has the edge remote from the boss A rounded, as at C', or otherwise shaped, so as to adapt the plate for use as a shovel. One of the lateral edges, $C^2$, of the plate C is sharpened to serve as a chopper, while the opposite edge, $C^3$, is serrated, so as to serve as a saw.

When the handle D is passed through a hole $A^2$ in the boss A, as shown in Fig. 1, the implement can be used either as a pick or as an intrenching-tool. When the handle D is passed through the hole A' in the boss A, the device is arranged so that it may be used either as a shovel, a chopper, or saw. In this position, as is seen in Fig. 2, the bar B, which forms the pick portion of the implement, lies opposite the handle D in such a position that it may be gripped by the hand, thus obviating any liability of the head to shift upon the handle when subjected to an end thrust such as would occur when the device is being used as a shovel or as a saw.

What I claim as my invention, and desire to secure by Letters Patent, is—

A tool of the character described comprising an integral pick and shovel, a central integral boss on one side and at the juncture of the tools, a perforation through the boss in line with the tools and a second perforation through the boss intersecting the first perforation and a handle adapted to be secured in said perforations.

In testimony whereof I have signed my name to this specification in the presence of two subscribing witnesses.

FRANCIS WEMYSS CHARTERIS DOUGLAS.

Witnesses:
G. F. WARREN,
ALFRED J. BOULT.